(12) United States Patent
Higbie

(10) Patent No.: US 7,205,481 B2
(45) Date of Patent: Apr. 17, 2007

(54) STACKABLE RACK CABLE MANAGER

(75) Inventor: Carrie Higbie, Ridgeland, MS (US)

(73) Assignee: The Siemon Company, Watertown, CT (US)

( * ) Notice: Subject to any disclaimer, the term of this patent is extended or adjusted under 35 U.S.C. 154(b) by 0 days.

(21) Appl. No.: 11/226,543

(22) Filed: Sep. 14, 2005

(65) Prior Publication Data

US 2006/0054344 A1 Mar. 16, 2006

Related U.S. Application Data

(60) Provisional application No. 60/609,627, filed on Sep. 14, 2004.

(51) Int. Cl.
*H02G 3/00* (2006.01)

(52) U.S. Cl. .................. 174/156; 174/154; 174/69; 174/72 A

(58) Field of Classification Search ........... 174/156, 174/154, 69, 72 A; 248/68.1
See application file for complete search history.

(56) References Cited

U.S. PATENT DOCUMENTS 770,278 A * 9/1904 Fletcher ................ 248/68.1
5,146,532 A * 9/1992 Hodge .................... 385/136

* cited by examiner

*Primary Examiner*—Jinhee Lee
(74) *Attorney, Agent, or Firm*—Cantor Colburn LLP

(57) ABSTRACT

A cable manager includes a first cable management section having a plurality of open-ended, U-shaped troughs separated by fingers. A second cable management section has a plurality of open-ended, U-shaped troughs separated by fingers. The second cable management section has a bottom surface contacting a top surface of the first cable management section to close the open-ended, U shaped troughs of the first cable management section. The second cable management section is secured to the first cable management section. A cover is secured to a top surface of the second cable management section to close the open-ended, U shaped troughs of the second cable management section.

3 Claims, 3 Drawing Sheets

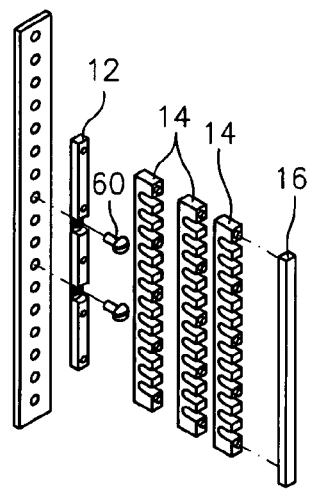
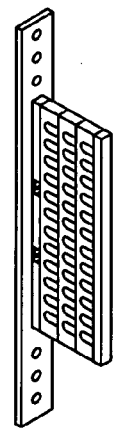
FIG. 9        FIG. 10
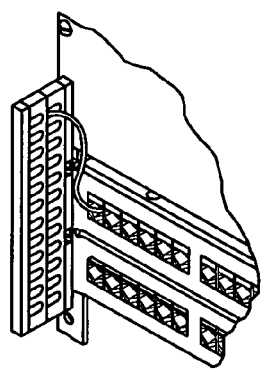
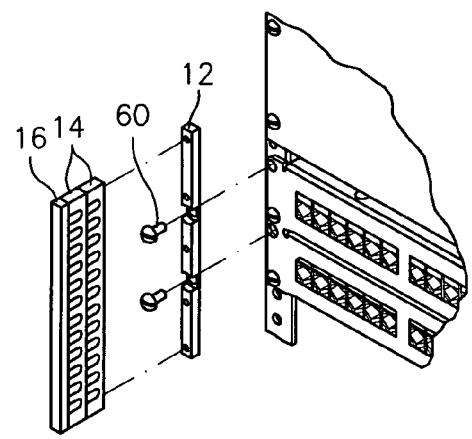
FIG. 11        FIG. 12
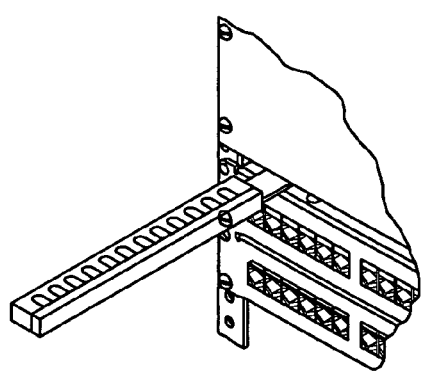
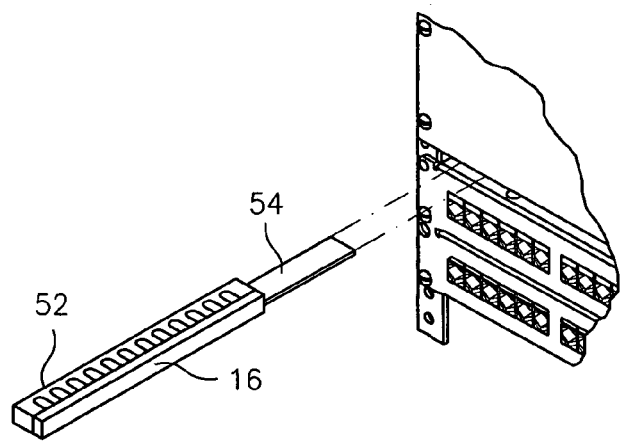
FIG. 13        FIG. 14

STACKABLE RACK CABLE MANAGER

CROSS-REFERENCE TO RELATED APPLICATIONS

This application claims the benefit of U.S. provisional patent application Ser. No. 60/609,627 filed on Sep. 14, 2004, the entire contents of which are incorporated herein by reference.

BACKGROUND

The invention relates to cable management and in particular to a stackable rack cable manager. Cable managers are used in conjunction with rack mounted components in order manage cables connected to the front face of equipment such as patch panels. Existing cable managers extend across the rack and consume space on the rack where additional equipment could be mounted. In addition, existing cable managers do not provide any mechanism to control crosstalk between cables. Thus, there is a need in the art for improved cable management.

SUMMARY

Embodiments of the invention include a cable manager including a first cable management section having a plurality of open-ended, U-shaped troughs separated by fingers. A second cable management section has a plurality of open-ended, U-shaped troughs separated by fingers. The second cable management section has a bottom surface contacting a top surface of the first cable management section to close the open-ended, U shaped troughs of the first cable management section. The second cable management section is secured to the first cable management section. A cover is secured to a top surface of the second cable management section to close the open-ended, U shaped troughs of the second cable management section.

BRIEF DESCRIPTION OF THE DRAWINGS

FIGS. 9–12 are perspective views illustrating mounting the cable manager of FIG. 1.

FIGS. 13 and 14 are perspective views illustrating mounting of the cable manager of FIG. 3.

DETAILED DESCRIPTION

Figure 1:
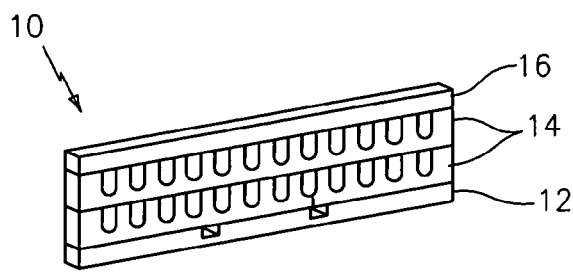
FIG. 1 is a perspective view of an exemplary cable manager.
Figure 2:
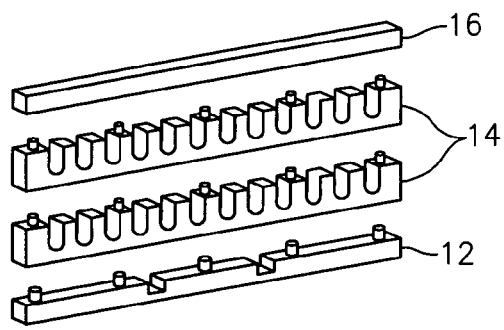
FIG. 2 is an exploded, perspective view of the cable manager of FIG. 1.

Embodiments of the invention provide a cable manager that does not consume rack space that may be reserved for equipment and that provides control of cables to mitigate inter-cable crosstalk also referred to as alien near end crosstalk. FIG. 1 is a perspective view of a cable manager 10 in an embodiment of the invention. Cable manager 10 includes a base 12, two cable management sections 14 and a cover 16. As described in further detail herein, any number of cable management sections 14 may be used and embodiments of the invention are not limited to two cable management sections 14. FIG. 2 is an exploded perspective view of the cable manager 10.

Figure 5:
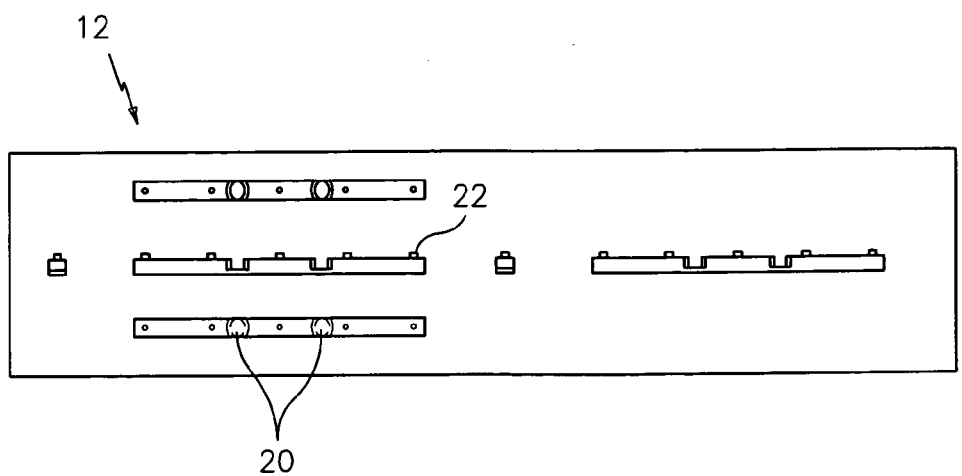
FIG. 5 depicts views of an exemplary base.

FIG. 5 provides multiple view of the base 12. Referring to FIGS. 2 and 5, the base 12 includes recessed mounting holes 20 that receive fasteners to secure the base 12 to a rack as described in further detail herein. Recessed mounting holes 20 are spaced to align with rack mounting holes on a communications rack. In this manner, base 12 serves as a mounting member. A number of posts 22 extend upward from a top surface of base 12. Posts 22 frictionally engage holes in the bottom of cable management section 14 to secure cable management section 14 to base 12.

Figure 6:
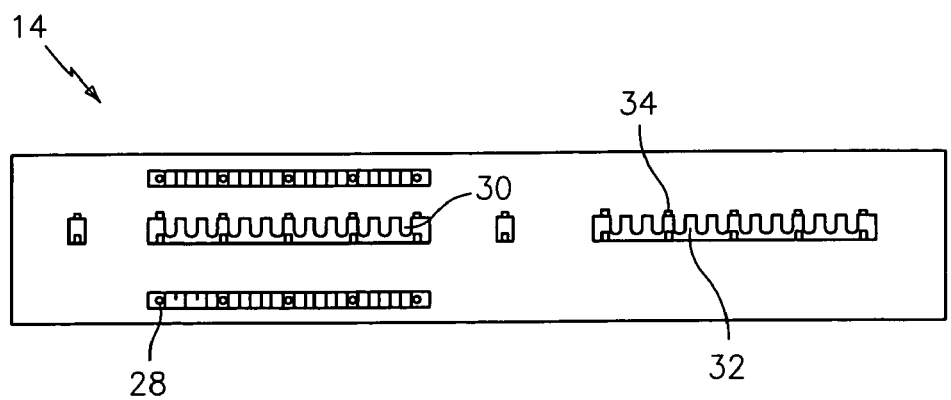
FIG. 6 depicts views of an exemplary cable management section.

Referring to FIGS. 2 and 6, the cable management section 14 includes a plurality of holes 28 corresponding to posts 22. Posts 22 are pressed into holes 28 to secure the cable management section 14 to the base 12. Cable management section 14 includes a number of open-ended, U-shaped troughs 30 for receiving cables. Each trough 30 receives one cable. The cable may be any known type of cable such as copper twisted pair, coaxial, fiber optic, etc. Troughs 30 are spaced apart by fingers 32 to space the cables an appropriate distance in order to reduce alien crosstalk as described herein. The upper cable management section has a bottom surface contacting a top surface of the lower cable management section to seal the open ended troughs 30. Posts 34 are formed on the top surface of cable management section 14 to engage either another cable management section 14 or cover 16. In this manner, multiple cable management sections 14 may be stacked to accommodate more cables.

Figure 7:
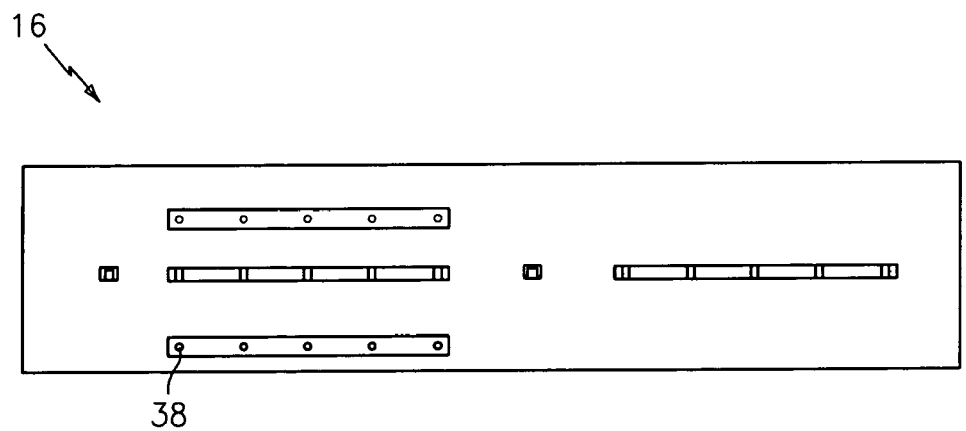
FIG. 7 depicts views of an exemplary cover.

Referring to FIGS. 2 and 7, cover 16 is a planar member having holes 38 on a bottom surface thereof to receive posts 34 on cable management section 14. Posts 34 are press fit into holes 38 in order to frictionally engage the cable management section 14 with cover 16. The cover 16 closes the open-ended, U-shaped troughs 30.

The base 12, cable management sections 14 and cover 16 may be made from hardened plastic or other materials depending on the application. FIG. 2 illustrates how multiple cable management sections 14 are stacked to accommodate 24 cables, each cable management section 14 having 12 troughs 30.

Figure 3:
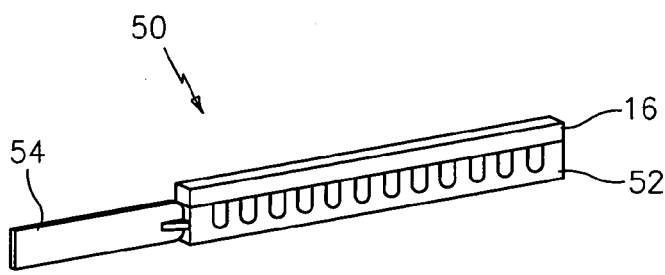
FIG. 3 is a perspective view of an exemplary cable manager in an alternate embodiment.
Figure 4:
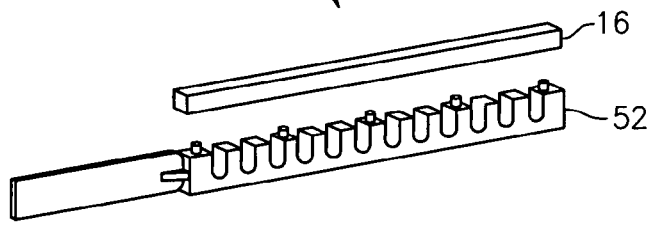
FIG. 4 is an exploded, perspective view of the cable manager of FIG. 3.

FIG. 3 depicts a cable manager 50 in an alternate embodiment of the invention. Cable manager 50 includes a cable management section 52 and a cover 16. Cover 16 is the same as that described with reference to FIG. 7. Cable management section 52 is similar to cable management section 14, but includes a mounting tab 54 for securing the cable manage 50 to a rack as described in further detail herein. Mounting tab 54 is a generally rectangular, planar member extending from cable management section 14. Mounting tab 54 serves as a mounting member and is integrally formed with cable management section 52. FIG. 4 is an exploded view of cable manager 50.

Figure 8:
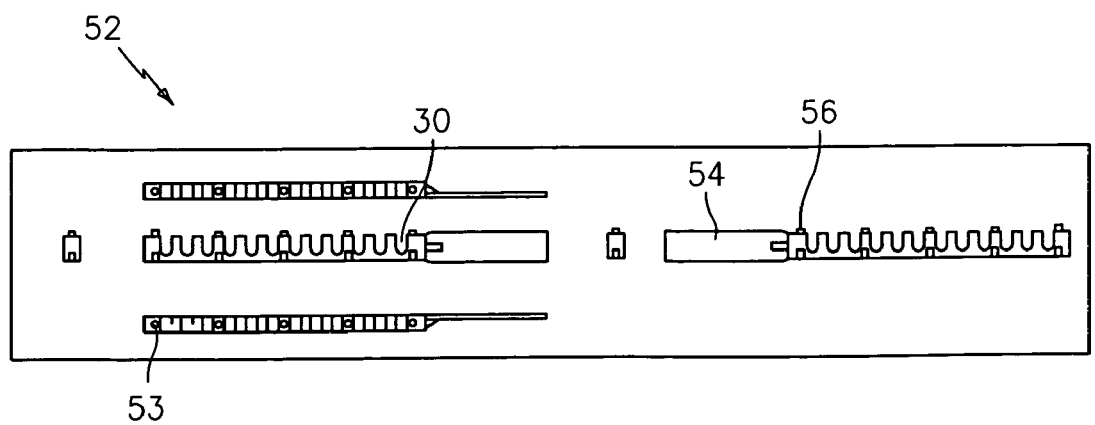
FIG. 8 depicts views of an exemplary cable management section in alternate embodiments.

Referring to FIGS. 4 and 8, cable management section 52 includes holes 53 corresponding to posts 34 on cable management section 14. This allows cable management section 52 to receive a cable management section 14 at the bottom surface. Troughs 30 are formed in cable management section 52 for receiving cables. A top surface of cable management section 52 includes posts 56 for engaging either cable management section 14 or cover 16.

FIGS. 9 and 10 depict cable manager 10 mounted to a vertical frame. Fasteners 60 are used to secure base 12 to the frame. Cable management sections 14 and cover 16 are then attached to complete the cable manager 10. Cables may be routed through troughs 30 before adding another cable management section 14.

FIGS. 11 and 12 depict the cable manager 10 secured to the frame of a rack with equipment present. Again, fasteners 60 are used to secure base 12 to the frame. Fasteners securing rack equipment to the rack may be removed to accommodate fasteners 60. An exemplary cable is shown in FIG. 11 leaving a patch panel and passing through a trough 30.

FIGS. 13 and 14 depict cable manager 50 in use secured to a patch panel. Mounting tab 54 is inserted in an opening between equipment or panels in the rack. As known in the art, a space may be present between equipment (e.g., patch panels) or between black panels in a rack. Mounting tab 54 is positioned in this space to secure cable manager 50 to the rack.

The cable manager allows full wire management of a rack with no loss of rack space. The base 12 uses the same holes as the electronics mount or other available blank portions of the rack. The cable manager also provides separation of cables eliminating ANEXT (alien near end cross talk) for 10G applications. This provides management both in the front of racks and cabinets as well as where bundles enter a data center facility and in ladder racks. The cable management sections stack via holes in one cable management section that correspond to posts in the next adjacent cable management section allowing a variety of configuration options built out from the front of a rack and/or perpendicular to equipment when the mounting tab version is used that affixes to the switch chassis or rack rails. With this modular approach, Velcro ties that are often removed and not replaced are eliminated. Cables can be removed and replaced in modular sections. In a data center environment, rack space is at a premium and by being able to address cable management without bulky vertical and horizontal managers, rack space is regained. If provided with patch cords in incremental lengths, full wire dressing is possible utilizing factory terminated patch cables rather than field terminated patch cables. Many companies are field terminating cables to eliminate the need for wire management which is not recommended by TIA without the proper test equipment that typically exists only in a factory type environment. The cable manager can also be used with modular furniture and regular office furniture to provide cable management when multiple cables are needed at a work area (for instance for a VoIP phone and network connection for a PC).

As it is modular in design, it can expand as necessary eliminating the problem of too many cables in wire management which prohibits management doors from closing. It can provide the same functionality within a cabinet at the back of a rack or within ladder rack.

The cost to produce the cable manager this will be relatively inexpensive and provides the ability to provide all rack solutions regardless of manufacturer. This also provides an ANEXT elimination without having to replace cable and connectors regardless of cable manufacturer or installation saving end-users potentially significant amounts of money. Another distinct advantage is freeing up rack space within either data center environments or in a retrofit situation where limited and/or no cable management possibilities exist. TIA 568B states that you should not field terminate without the proper test equipment (which typically exists only in a factory environment) allowing customers to bring their infrastructure to within standards specifications.

The cable manager may be made from hardened plastic components that snap together allowing the management of 12 cables per 6" component. The modular pieces snap together allowing 12 cables to be moved at once, but any number of pieces may be snapped together either aligned or staggered for maximum flexibility depending on site conditions. The material used to make the various components is not limited to plastic. The method of interlocking modular pieces is not limited to the post-and-hole method described.

Instead of 12 troughs, a 24 cable management section having 24 toughs may be offered for bulk cable assemblies. A shielded version may be produced by making components from metal or metallized plastic. Larger troughs may be used accommodating larger cables such as category 7 cables.

While this invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A cable manager for mounting on a rack comprising:
a first cable management section having a plurality of open-ended, U-shaped troughs separated by fingers;
a second cable management section having a plurality of open-ended, U-shaped troughs separated by fingers, the second cable management section having a bottom surface contacting a top surface of the first cable management section to close the open-ended, U shaped troughs of the first cable management section, the second cable management section being secured to the first cable management section; a cover secured to a top surface of the second cable management section to close the open-ended, U-shaped troughs of the second cable management section;
a base secured to a bottom surface of the first cable management section, the base having a top surface adjacent the bottom surface of the first cable management section, the base having a planar bottom surface, the base has recessed mounting holes spaced to match rack mounting holes and
wherein, the base has posts extending from a top surface thereof, the first cable management section having holes formed in a bottom surface thereof for receiving the posts on the base to frictionally secure the base to the first cable management section.

2. The cable manager of claim 1 wherein:
the first cable management section has posts extending from a top surface thereof, the second cable management section having holes formed in a bottom surface thereof for receiving the posts on the first cable management section to frictionally secure the first cable management section to the second cable management section.

3. The cable manager of claim 1 wherein:
the second cable management section has posts extending from a top surface thereof, the cover having holes formed in a bottom surface thereof for receiving the posts on the second cable management section to frictionally secure the cover to the second cable management section.

* * * * *